US012235887B2

(12) United States Patent
Brehm et al.

(10) Patent No.: US 12,235,887 B2
(45) Date of Patent: Feb. 25, 2025

(54) SYSTEMS AND METHODS FOR OPTIMIZING DELIVERY OF CONTENT RECOMMENDATIONS

(71) Applicant: Adeia Guides Inc., San Jose, CA (US)

(72) Inventors: Michael James Brehm, Allen, TX (US); Walter John Schmidt, Dallas, TX (US); Benjamin Harden, Coronado, CA (US)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/130,026

(22) Filed: Apr. 3, 2023

(65) Prior Publication Data

US 2023/0267140 A1 Aug. 24, 2023

Related U.S. Application Data

(63) Continuation of application No. 17/349,352, filed on Jun. 16, 2021, now Pat. No. 11,651,021, which is a
(Continued)

(51) Int. Cl.
*G06F 16/435* (2019.01)
*G06F 16/2457* (2019.01)
(Continued)

(52) U.S. Cl.
CPC ...... *G06F 16/435* (2019.01); *G06F 16/24578* (2019.01); *G06F 16/447* (2019.01); *G06F 16/9535* (2019.01); *H04N 21/44226* (2020.08)

(58) Field of Classification Search
CPC ............ G06F 16/9536; G06F 16/9538; G06F 16/435; G06F 16/24578; G06F 16/447;
(Continued)

(56) References Cited

U.S. PATENT DOCUMENTS

| 6,239,794 | B1 | 5/2001 | Yuen et al. |
| 6,564,378 | B1 | 5/2003 | Satterfield et al. |
| 7,761,892 | B2 | 7/2010 | Ellis et al. |
| 9,208,316 | B1 | 12/2015 | Hill et al. |
| 10,296,558 | B1 | 5/2019 | McInerny |

(Continued)

FOREIGN PATENT DOCUMENTS

WO 2013184920 A2 12/2013

OTHER PUBLICATIONS

H. Sumiyoshi et al., "CurioView: TV recommendations related to content being viewed," 2010 IEEE International Symposium on Broadband Multimedia Systems and Broadcasting (BMSB), Shanghai, China, 2010, pp. 1-6, doi: 10.1109/ISBMSB.2010.5463129. Year: 2010).

*Primary Examiner* — Michael Pham
(74) *Attorney, Agent, or Firm* — HALEY GUILIANO LLP

(57) ABSTRACT

The system and methods described herein provide content recommendations to user equipment timed to reduce interruption of content. A content recommendation application detects output of first content and determines viewing metrics for the first content. Using the determined viewing metrics, the content recommendation application determines whether output of a content recommendation should be blocked. In response to determining that the viewing metrics indicate output of the content recommendation should be blocked, the content recommendation application blocks the content recommendation. Upon receiving an input changing output of the first content to output of a second content, the content recommendation application unblocks and outputs the content recommendation.

18 Claims, 8 Drawing Sheets

Related U.S. Application Data continuation of application No. 16/152,075, filed on Oct. 4, 2018, now Pat. No. 11,068,527.

(51) Int. Cl.
  *G06F 16/44* (2019.01)
  *G06F 16/9535* (2019.01)
  *H04N 21/442* (2011.01)

(58) Field of Classification Search
  CPC .......... G06F 16/9535; H04N 21/44226; H04N 21/44218; H04N 21/4532; H04N 21/454; H04N 21/4622; H04N 21/4668; H04N 21/4826; H04N 21/8126; H04N 21/42201
  USPC ....................................................... 707/725
  See application file for complete search history.

(56) References Cited

U.S. PATENT DOCUMENTS

| | | |
|---|---|---|
| 2005/0182924 A1 | 8/2005 | Sauve et al. |
| 2005/0198287 A1 | 9/2005 | Sauve et al. |
| 2007/0271580 A1 | 11/2007 | Tischer et al. |
| 2009/0133051 A1 | 5/2009 | Hildreth |
| 2011/0072448 A1 | 3/2011 | Stiers et al. |
| 2011/0289524 A1 | 11/2011 | Toner et al. |
| 2013/0294755 A1 | 11/2013 | Arme et al. |
| 2014/0059576 A1 | 2/2014 | Mulé |
| 2015/0172777 A1 | 6/2015 | Park et al. |
| 2015/0189377 A1 | 7/2015 | Wheatley et al. |
| 2015/0339539 A1 | 11/2015 | Gu et al. |
| 2016/0323643 A1* | 11/2016 | Panchaksharaiah ........................ H04N 21/4753 |
| 2017/0286528 A1 | 10/2017 | Peterson |
| 2021/0311981 A1 | 10/2021 | Brehm et al. |

\* cited by examiner

SYSTEMS AND METHODS FOR OPTIMIZING DELIVERY OF CONTENT RECOMMENDATIONS

CROSS-REFERENCE TO RELATED APPLICATIONS

This application is a continuation of U.S. patent application Ser. No. 17/349,352, filed Jun. 16, 2021, which is a continuation of U.S. patent application Ser. No. 16/152,075, filed Oct. 4, 2018, now U.S. Pat. No. 11,068,527, which are hereby incorporated by reference herein in their entireties.

BACKGROUND

The present disclosure is directed to delivering content recommendations and, more particularly, to systems and methods that time delivery of content recommendations based on a user's engagement with content.

SUMMARY

Delivering timely and unobtrusive content recommendations presents difficulties, particularly for real-time content (e.g., sports matches). Recommendations (e.g., presented as notifications or alerts) may overwhelm the user's viewing experience and distract the user from content with which the user is engaged. If a system, on the other hand, holds recommendations until a user finishes consuming content, then the recommendation may become stale.

Solutions over conventional systems for providing a user with timely content recommendations, especially recommendations for real-time content (e.g., sports games), are described herein. The systems and methods described herein achieve benefits over conventional systems by timing the display of recommendations for a time that will have less likelihood of distracting a user from the current content. A content recommendation system determines content that may be interesting to the user is available. The content recommendation system determines the user's engagement level with content currently output by the user equipment. The content recommendation system then, based on the user's engagement level, determines whether to present the content recommendation at the present time or whether to block the recommendation and hold it for later presentation. For example, if the user has been watching a show for less than a minute, the system may consider that to be a low level of engagement, whereas if the user has been watching a show for 10 minutes that may be considered a high level of engagement. Thus, the content recommendation system takes into account not only the content recommendations but also the user's engagement before delivering content recommendations. The content recommendation system may subsequently receive an indication that the user's engagement level with content has changed. For example, if the content recommendation system detects a command to change from one piece of content to a second piece of content, the content recommendation system may reinterpret the engagement level. Upon detecting such a change, the content recommendation system unblocks the content recommendation and causes the recommendation to be presented to the user.

Several techniques may be used by the systems and methods described herein to determine a user's engagement level with content being presented. As discussed above, the content recommendation system may track how long a user has been consuming the content and compare that time against one or more thresholds to determine an engagement level. For example, less than one minute may be a low level of engagement, between one and five minutes may be a medium level of engagement, and over five minutes may be a high level of engagement. In some embodiments, these thresholds may be adjusted over time and refined to account for a user's reactions to content recommendations. The content recommendation system may also consider the user's content preferences and how those preferences correlate with the content to determine engagement. For example, if the user's content preferences indicate a strong affinity for animation movies, and the current content is an animation movie, the system may determine the user has a high level of engagement with the current content. Further, the content recommendation system may employ a set of weights corresponding with different preferences and the strength of the match to determine engagement levels. In some embodiments, the content recommendation system may take into account interaction logs between a user and a plurality of devices to determine engagement. For example, a user is tuned to a channel but has several recent interactions with a mobile device may be considered to have a low level of engagement with the content (e.g., the user is interacting with a smartphone in a way that indicates a low level of engagement with the content). In another example, a content recommendation system may routinely poll user equipment to obtain an engagement level of the user with current content. A user equipment device may employ gaze detection techniques to determine a user's engagement level with content and the content recommendation system may obtain that information from the user equipment.

In some embodiments, the content recommendation system may balance the user's engagement level with the user's predicted interest in the recommendation. The content recommendation system may access the user's content preferences and correlate those preferences with information about the content to be recommended. For example, if the user is a baseball fan, then his content preferences may indicate preferred teams or may indicate he watches baseball games in the later innings. The content recommendation system may then retrieve information about a current game and determine the game matches criteria associated with the user's content preferences. Thus, the system may determine a particular game is associated with a high level of predicted interest. In that scenario, the content recommendation system may present the content recommendation even though a user's engagement level with current content is also high. In some embodiments, the predicted interest may be a calculated value (e.g., an integer value) calculated from a combination of interest weights being matched to attributes of the content being recommended. As described below, the predicted interest level may be compared against the engagement level and/or a set of interest thresholds when the content recommendation system determines how to process the content recommendation.

Several techniques may be employed to determine a predicted interest level for a piece of content being recommended. As discussed above, the content recommendation system may compare information about the content with the user's preferences to build a predicted interest level. Additionally, or alternatively, the content recommendation system may access information about the content that is untethered to the user to generate the predicted interest level. For example, the score of a game, the time remaining, the number of people currently watching a game, the ranks of the teams involved, the frequency of scoring in a game, the amount of social media posts about a game, and the number of commentators presenting discussions about a game are all potential indicators for whether a game is interesting. The content recommendation system may weigh such factors into the calculation of a predicted interest level.

Thus, the systems and methods described herein solve the problem of balancing the need to inform a user of content recommendations that may lose value after the passing of time with the user's desire to be free of distracting notification messages. The techniques described herein present content recommendations at times when a user is less likely to find them obtrusive, either because the user is less engaged with the content being interrupted or because the content recommendation rises above a threshold necessitating prompt notification.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
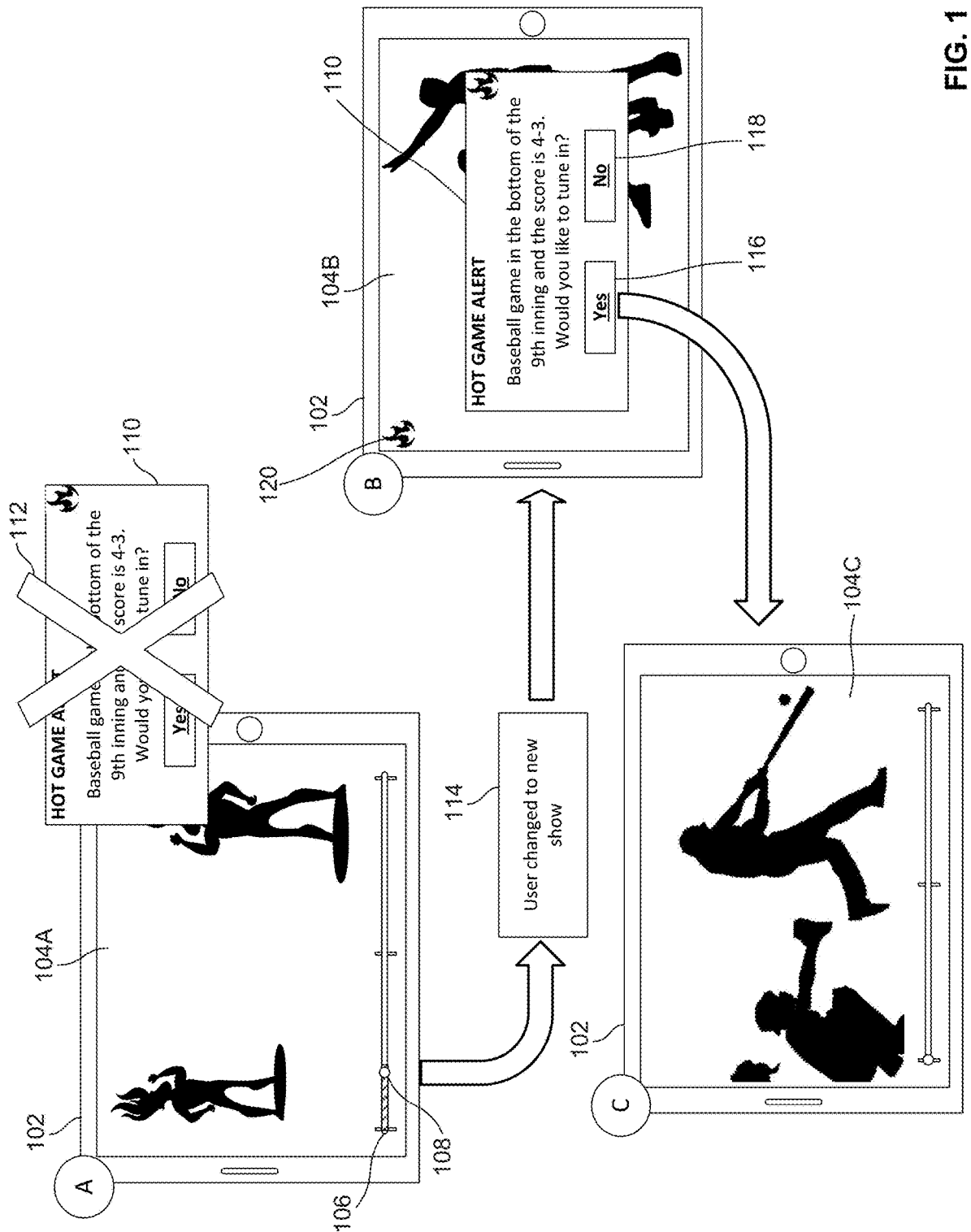
FIG. 1 shows an illustrative series of user interface screens on a content consumption device in a content recommendation system that times delivery of content recommendations based on a user's engagement with content, in accordance with some embodiments of the disclosure.

FIG. 1 shows an illustrative series of user interface screens on a content consumption device in a content recommendation system that times delivery of content recommendations based on a user's engagement with content. Specifically, FIG. 1 depicts user equipment 102 at three time points: A, B, and C. User equipment 102 is depicted as a tablet device in FIG. 1. In some embodiments, user equipment 102 may be a smartphone, set-top box, personal computer, or other device suitable for rendering content (e.g., movies, television shows, linear programming, and over-the-top (OTT) content). At time point A, user equipment 102 is displaying a first content item 104A (illustrated as an animated superhero movie). At time point A, the user equipment 102 is also displaying a time bar 106 that includes a current position indicator 108 that is approximately 20 percent down the time bar for the first content item 104A.

In FIG. 1, a content recommendation system has generated a content recommendation 110 for a user interacting with user equipment 102. Specifically, the content recommendation system generated a recommendation for a baseball game that is in the bottom of the ninth inning and has a score of four to three. But the content recommendation system has determined to block the content recommendation, depicted with the "X" 112 over the content recommendation 110, at time point A, in favor of later presentation of the content recommendation. For example, the content recommendation system determines a level of engagement a user has with the first content item 104A being displayed by user equipment 102. In the example of FIG. 1, the content recommendation system determines that the first content item 104A has been displayed to the user on user equipment 102 for some amount of time, perhaps 10 minutes. Based on that amount of time, the content recommendation system determines the user's engagement with the first content item 104A exceeds a threshold at which the content recommendation system determines content recommendations should be blocked.

As discussed more fully below with FIGS. 5-10, the content recommendation system may employ several techniques to determine whether to present a content recommendation or block a content recommendation for later presentation. For example, blocking a content recommendation may comprise blocking transmission of a message that contains the content recommendation (e.g., a server-to-client communication). Other suitable techniques include preventing, at a user equipment, the presentation of a content recommendation prompt on a display to the user. Other suitable techniques may be employed to delay a content recommendation until such time as appropriate for user presentation.

Between time point A and time point B of FIG. 1, the user equipment 102 received an indication 114 that the user is changing the display to a new show. In response to receiving the indication 114 that the user is changing the display to a new show, the content recommendation system determines that the user has a low level of engagement with the new show and that time point B would be an optimal time to present a notification to the user regarding the content recommendation.

At time point B, the user equipment 102 is displaying a second content item 104B (illustrated as a basketball game), which a user changed to after time point A. The user equipment 102 is also displaying the content recommendation prompt 110 to the user as an invitation to change the display to the recommended content. While depicted in FIG. 1 as a prompt that occurs after a user equipment 102 begins displaying the second content item 104B, the content recommendation prompt 110 may be displayed by the user equipment 102 prior to the second content 104B being displayed. For example, the user equipment 102 may detect a channel change command and before making the change in content, present the content recommendation prompt 110.

In the example of FIG. 1, the recommended content is a baseball game with a close score in the late stages of the game. In some embodiments, the content recommendation 110 provides details on the scenario of the content recommendation. In some embodiments, the content recommendation 110 provides options such as a "Yes" option 116 and a "No" option 118. In the case of a user selecting the "Yes" option 116, the user equipment 102 will change to the recommended content 104C at time point C. In the case of a user selecting the "No" option 118, the user equipment 102 will not change to the recommended content 104C. For example, the user equipment 102 may continue to present the second content 104B upon receiving a selection of the "No" option 118.

In some embodiments, the user equipment 102 displays a notification icon 120 informing the user that a content recommendation is available. For example, the user equipment 102 may hold back the recommendation until such time as the user activates icon 120.

Figure 2:
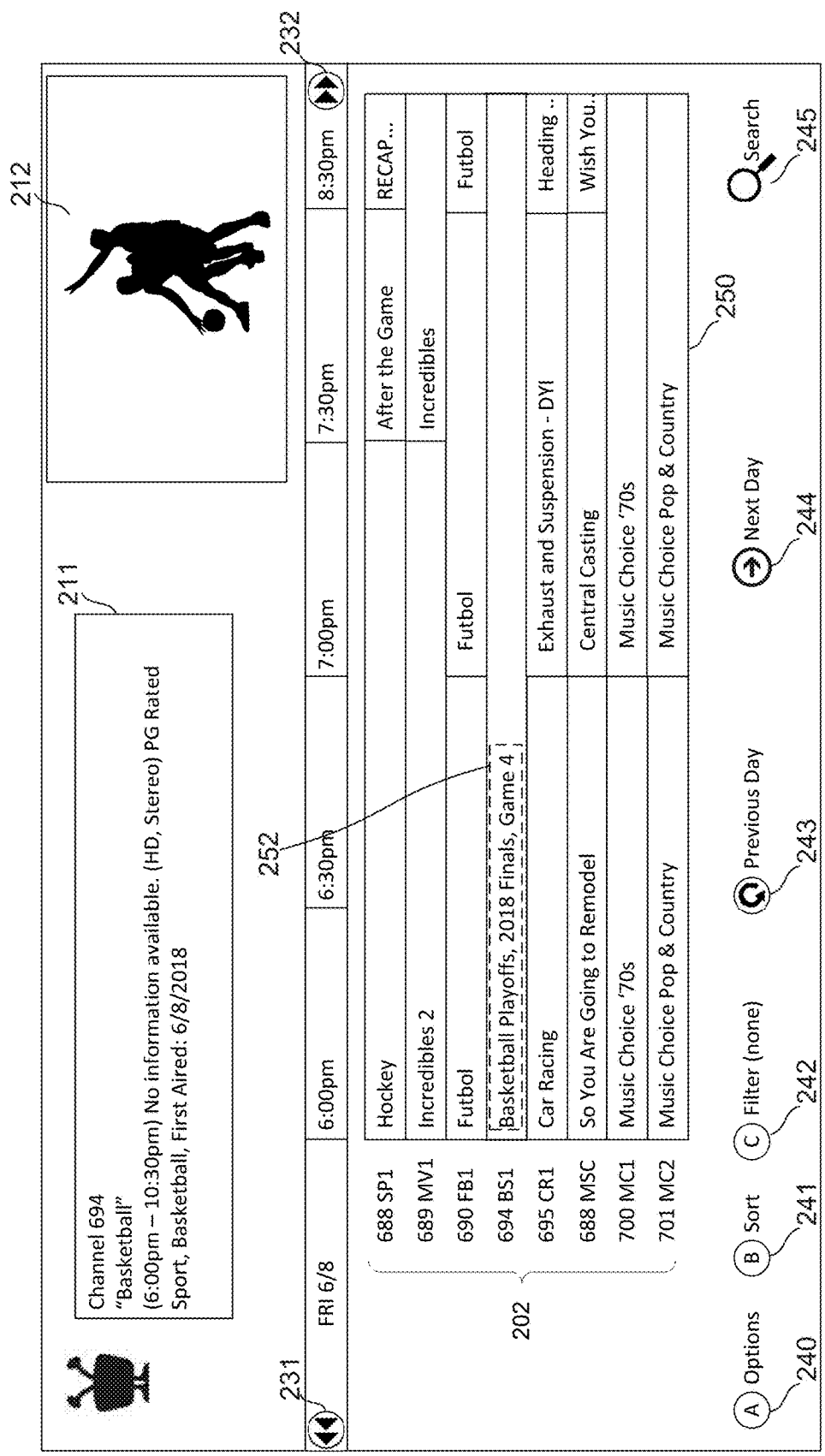
FIG. 2 shows an illustrative embodiment of a display screen that may be used to provide media guidance application listings and other media guidance information, in accordance with some embodiments of the disclosure.

FIG. 2 is an illustrative embodiment of a display screen that may be used by a media guidance application to provide listings and other media guidance information, in accordance with some embodiments of the disclosure. Program listings display 200 includes a grid 250 arranged by time and channel that also enables access to different types of content in a single display. Grid 250 may include (1) a column of channel/content type identifiers 202 where each channel/content type identifier (which is a cell in the column) identifies a different channel or content type available; and (2) a row of time identifiers (displayed above program listings), where each time identifier (which is a cell in the row) identifies a time block of programming. Grid 250 also includes cells of program listings, such as program listing 251 (highlighted to indicate the user equipment is currently receiving the content selected at 251), where each listing provides the title of the program provided on the listing's associated channel and time. With a user input device, a user can select program listings by moving highlight region 252. Information relating to the program listing selected by highlight region 252 may be provided in program information region 211. Region 211 may include, for example, the program title, the program description, the time the program is provided (if applicable), the channel the program is on (if applicable), the program's rating, and other desired information. With a user input device, a user can also select grid forward option 231 or grid back option 232, which shift the displayed program times for content selection. The display 200 may also provide several elements such as options element 240, which raises a submenu to customize display 200 options; sort element 241, which allows a user to customize the sorting of channels (e.g., sort by channel number or genre type); filter option 242 (e.g., allowing a user to filter listing by genre); previous-day element 243 (e.g., shifting the grid 250 by 24 hours into the past); next-day element 244 (e.g., shifting the grid by 24 hours into the future); and search element 245 (e.g., raising a search interface).

In addition to providing access to linear programming (e.g., content that is scheduled to be delivered by multicast delivery to user equipment devices at a predetermined time and provided according to a schedule), the media guidance application also provides access to non-linear programming (e.g., content accessible to a user equipment device at any time and not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on demand as streaming content or downloadable content through an Internet website or other Internet access (e.g., FTP).

Display 200 may also include video region 212. Video region 212 may allow the user to view and/or preview programs that are currently available, will be available, or were available to the user. The content of video region 212 may correspond to, or be independent from, one of the listings displayed in grid 250. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other content access application display screens of the embodiments described herein.

Upon receiving a selection to change to content selected by region 252, a user equipment device (such as user equipment 102) may inform a content recommendation system of the change of content output such as described with reference to step 506 of FIG. 5 below.

The instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

Applications may be, for example, stand-alone applications implemented on user equipment devices, media content sources, or servers. For example, the media guidance application or content recommendation application may be implemented as software or a set of executable instructions, which may be stored in storage (e.g., storage 308 or storage 414) and executed by control circuitry (e.g., control circuitry 304 or control circuitry 410). In some embodiments, applications may be client-server applications where only a client application resides on the user equipment device (e.g., user equipment 102) and a server application resides on a remote server (e.g., server 404). For example, applications may be implemented partially as a client application on control circuitry 304 of each one of user equipment devices 300 and user equipment system 301 and partially on a remote server such as a server application (e.g., server 404) running on control circuitry (e.g., 410) of the remote server. When executed by control circuitry of the remote server (such as server 404), the content recommendation application may instruct the control circuitry to generate the content delivery application displays and transmit the generated displays to the user equipment devices. The content recommendation application may instruct the control circuitry of the content source to transmit data for storage on the user equipment. The client application may instruct control circuitry of the receiving user equipment to generate the content delivery application displays.

Figure 3:
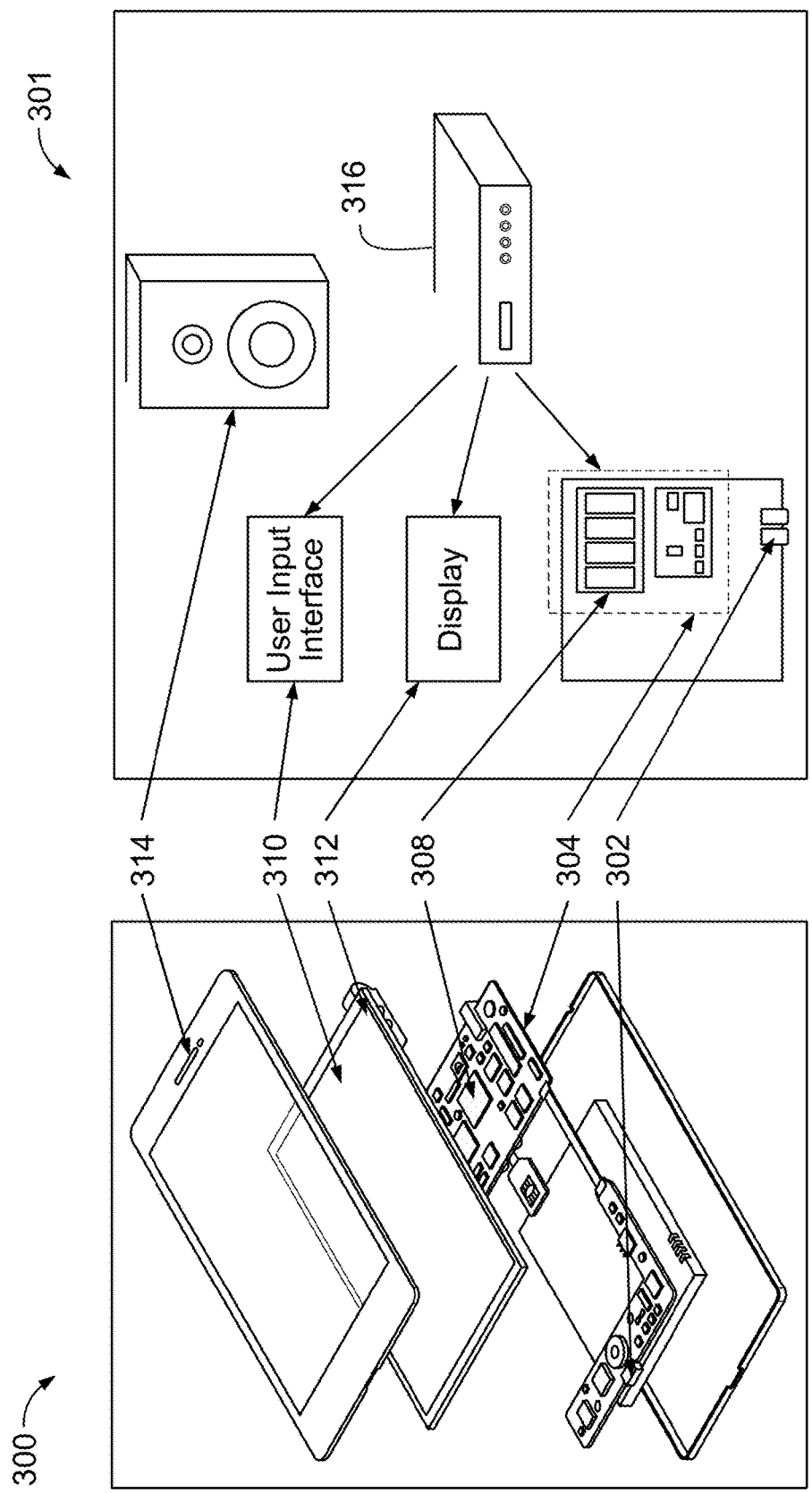
FIG. 3 is a block diagram of an illustrative user equipment, in accordance with some embodiments of the disclosure.

Users may access content and the applications from one or more of their media devices, i.e., user equipment. FIG. 3 shows generalized embodiments of an illustrative device, i.e., user equipment 102. For example, user equipment 102 may be a smartphone device, a tablet, or a remote control, such as illustrative user equipment 300. In another example, user equipment 102 may be part of a user equipment system 301. User equipment system 301 may include a set-top box 316. Set-top box 316 may be communicatively connected to speaker 314 and display 312. In some embodiments, display 312 may be a television display or a computer display. In some embodiments, set-top box 316 may be communicatively connected to user interface input 310. In some embodiments, user interface input 310 may be a remote control device. Set-top box 316 may include one or more circuit boards. In some embodiments, the circuit boards may include control circuitry and storage (e.g., RAM, ROM, Hard Disk, Removable Disk, etc.). In some embodiments, circuit boards may include an input/output path. More specific implementations of user equipment devices are discussed below in connection with FIG. 4. Each one of user equipment devices 300 and user equipment system 301 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304 and storage 308. Control circuitry 304 may be used to send and receive commands, requests, and other suitable data using I/O path 302. I/O path 302 may connect control circuitry 304 to one or more communications paths (described below). I/O functions may be provided by one or more of these communications paths but are shown as a single path in FIG. 3 to avoid overcomplicating the drawing.

Control circuitry 304 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an application stored in memory (e.g., storage 308). Specifically, control circuitry 304 may be instructed by the application to perform the functions discussed above and below. For example, the application may provide instructions to control circuitry 304 to generate the media guidance displays. In some implementations, any action performed by control circuitry 304 may be based on instructions received from the application.

In client server-based embodiments, control circuitry 304 may include communications circuitry suitable for communicating with a content recommendation application server (e.g., server 404) or other networks or servers. The instructions for carrying out the above-mentioned functionality may be stored on the content recommendation application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, non-transitory computer readable medium, or any other suitable fixed or removable storage devices, and/or any combination of the same. Storage 308 may be used to store various types of content, media guidance data, and instructions for executing content access applications. Nonvolatile memory may also be used (e.g., to launch a boot-up routine and other instructions).

Control circuitry 304 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch-and-record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touchscreen, touchpad, stylus input, joystick, voice recognition interface, or other user input interfaces. Display 312 may be provided as a stand-alone device or integrated with other elements of each one of user equipment device 300 and user equipment system 301. For example, display 312 may be a touchscreen or touch-sensitive display. In such circumstances, user input interface 310 may be integrated with or combined with display 312. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be integrated with the control circuitry 304. Speakers 314 may be provided as integrated with other elements of each one of user equipment device 300 and user equipment system 301 or may be stand-alone units. The audio component of videos and other content displayed on display 312 may be played through speakers 314. In some embodiments, the audio may be distributed to a receiver (not shown), which processes and outputs the audio via speakers 314.

The content recommendation application and media guidance application may be implemented using any suitable architecture. For example, the media guidance application may be a stand-alone application wholly implemented on each one of user equipment device 300 and user equipment system 301. In such an approach, instructions for the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the applications are client-server based application. Data for use by a thick or thin client implemented on each one of user equipment device 300 and user equipment system 301 is retrieved on-demand by issuing requests to a server remote to each one of user equipment device 300 and user equipment system 301. In one example of a client-server based media guidance application, control circuitry 304 runs a web browser that interprets web pages provided by a remote server (e.g., server 404). For example, the remote server may store the instructions for the application in a storage device (e.g., 414). The remote server may process the stored instructions using circuitry (e.g., control circuitry 410) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the applications are downloaded and interpreted or otherwise run by an interpreter or virtual machine (run by control circuitry 304). In some embodiments, the applications may be encoded in the ETV Binary Interchange Format (EBIF), received by control circuitry 304 as part of a suitable feed, and interpreted by a user agent running on control circuitry 304. For example, the applications may be an EBIF application. In some embodiments, the content delivery application may be defined by a series of JAVA-based files that are received and run by a local virtual machine or other suitable middleware executed by control circuitry 304. In some of such embodiments (e.g., those employing MPEG-2 or other digital media encoding schemes), the applications may be, for example, encoded and transmitted in an MPEG-2 object carousel with the MPEG audio and video packets of a program.

Figure 4:
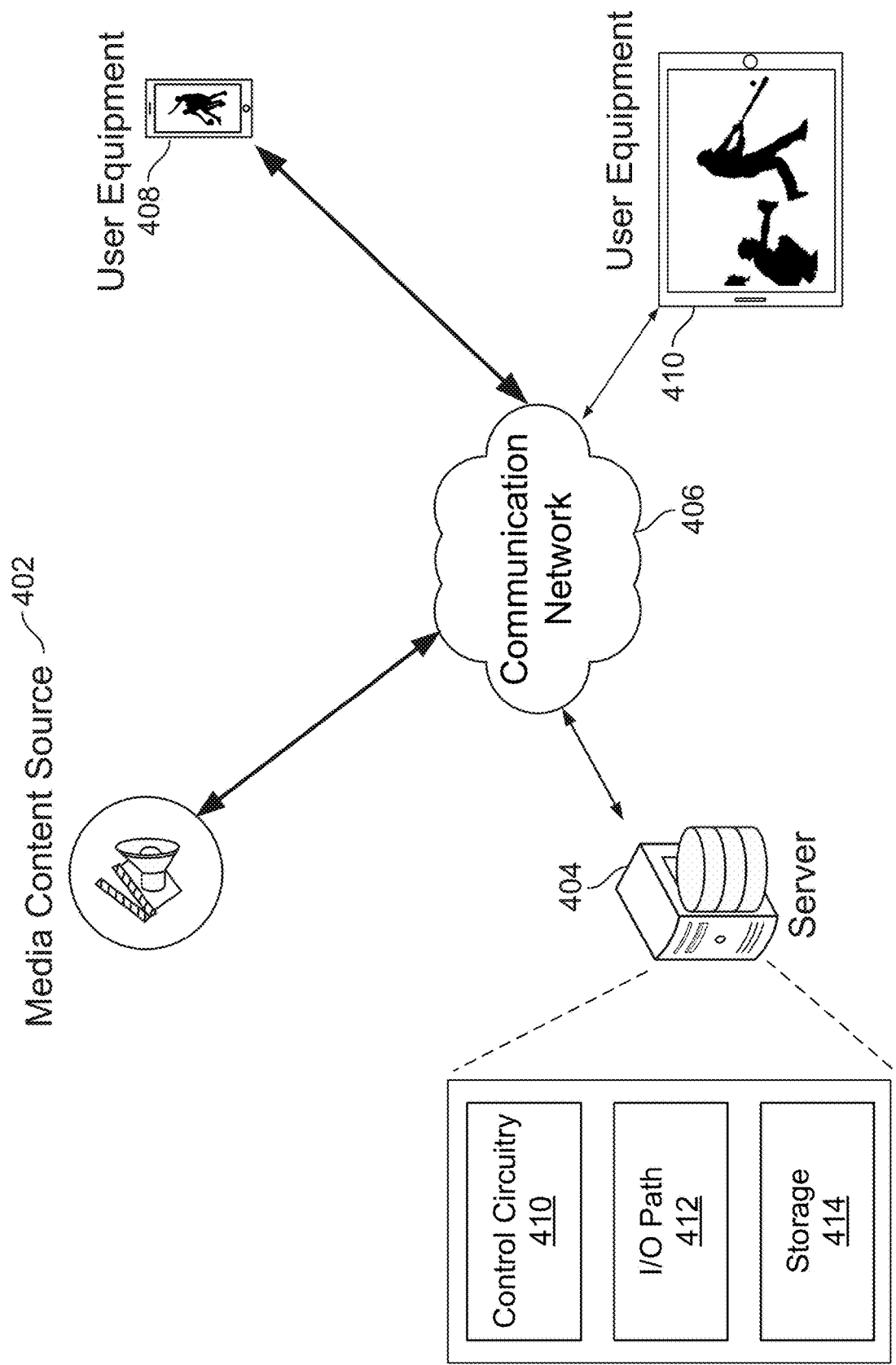
FIG. 4 is a diagram of an illustrative media system, in accordance with some embodiments of the disclosure.

FIG. 4 is a diagram of an illustrative media system, in accordance with some embodiments of the disclosure. User equipment devices 408 and 410 (such as user equipment device 102) may be coupled to communication network 406. Communication network 406 may be one or more networks including the Internet, a mobile phone network, mobile voice or data network (e.g., a 4G or LTE network), cable network, public switched telephone network, or other types of communications network or combinations of communications networks. Paths (e.g., depicted as arrows connecting the respective devices to communication network 406) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths, but are shown as a single path in FIG. 4 to avoid overcomplicating the drawing.

Although communications paths are not drawn between user equipment devices, these devices may communicate directly with each other via communication paths as well as other short-range, point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communication network 406.

System 400 includes media content source 402 and server 404. Communications with the media content source 402 and server 404 may be exchanged over one or more communications paths, but are shown as a single path in FIG. 4 to avoid overcomplicating the drawing. In addition, there may be more than one of each of media content source 402 and server 404, but only one of each is shown in FIG. 4 to avoid overcomplicating the drawing. If desired, media content source 402 and server 404 may be integrated as one source device.

In some embodiments, the server 404 may include control circuitry 410 and storage 414 (e.g., RAM, ROM, Hard Disk, Removable Disk, etc.). The server 404 may also include an input/output path 412. I/O path 412 may provide device information, or other data, over a local area network (LAN) or wide area network (WAN), and/or other content and data to control circuitry 410, which includes processing circuitry, and storage 414. Control circuitry 410 may be used to send and receive commands, requests, and other suitable data using I/O path 412. I/O path 412 may connect control circuitry 304 (and specifically processing circuitry) to one or more communications paths.

Control circuitry 410 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 410 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 410 executes instructions for an emulation system application stored in memory (e.g., storage 414).

Memory may be an electronic storage device provided as storage 414 that is part of Control circuitry 410. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

Server 404 may retrieve guidance data from media content source 402, process the data as will be described in detail below, and forward the data to the client devices 408 and 410. Media content source 402 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 402 may be the originator of content (e.g., a television broadcaster, a Webcast provider, etc.) or may not be the originator of content (e.g., an on-demand content provider, an Internet provider of content of broadcast programs for downloading, etc.). Media content source 402 may include cable sources, satellite providers, on-demand providers, Internet providers, over-the-top content providers, or other providers of content. Media content source 402 may also include a remote media server used to store different types of content (including video content selected by a user), in a location remote from any of the client devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 402 may also provide media guidance data that can be used to create carousels and queries as described herein. Media guidance data may be provided to the client devices using any suitable approach. Program schedule data and other guidance data may be provided to the client devices on a television channel sideband, using an in-band digital signal, using an out-of-band digital signal, or by any other suitable data transmission technique.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communication network 406. In such embodiments, user equipment devices may operate in a peer-to-peer manner without communicating with a central server.

The systems and devices described in FIGS. 3 and 4 enable not only display of the screens of FIGS. 1-2, but also enable the execution of processes described in FIGS. 5-10. It should be noted that each step of processes described in FIGS. 5-10 can be performed by control circuitry (e.g., in a manner instructed to control circuitry 304 by a content recommendation application) or any of the system components shown in FIG. 3. It should be noted that the embodiments of FIGS. 5-10 can be combined with any other embodiment in this description are not limited to the devices or control components used to illustrate the processes.

Figure 5:
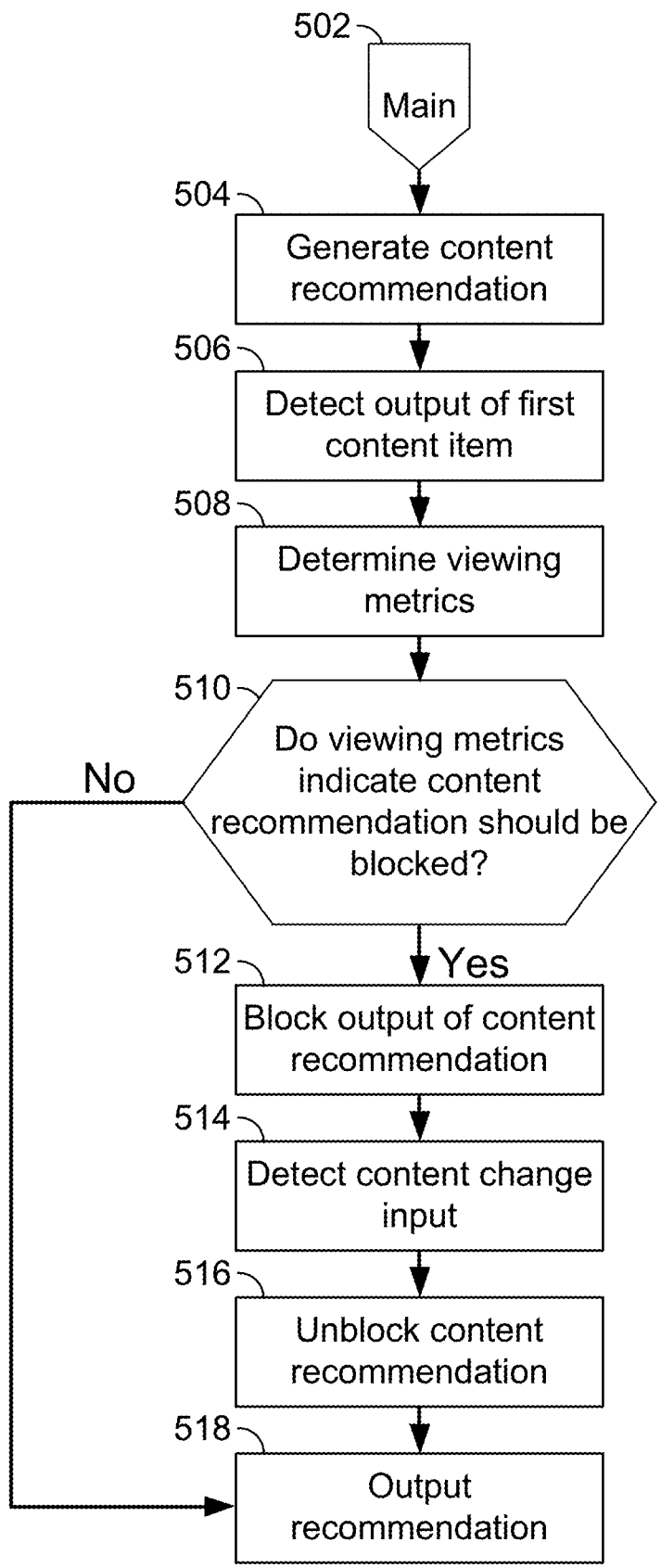
FIG. 5 is a flowchart of a detailed illustrative process for timing the delivery of a content recommendation, in accordance with some embodiments of the disclosure.

FIG. 5 is a flowchart of a detailed illustrative process for timing the delivery of a content recommendation, in accordance with some embodiments of the disclosure. A main loop of process 500 begins at step 502. At step 504, a content recommendation application generates (e.g., using control circuitry 410) a content recommendation. For example, the content recommendation application may identify a plurality of content items, obtain information about those items, and then calculate a predicated interest level for a user (e.g., an operator of user equipment 102) for each content item. The content recommendation application may then select content deemed more interesting to that user (e.g., with a higher interest level).

At step 506, the content recommendation application detects (e.g., using control circuitry 410) output of a first content item. For example, the content recommendation application may obtain information indicating that a user is viewing a movie on user equipment 102. That information may comprise a message received at server 404 via an I/O path 412. Additionally, or alternatively, a content recommendation application may be executed by the control circuitry 304 of user equipment 102. The content recommendation application may, in those embodiments, access status information for the user equipment 102 from storage (e.g., 308 of FIG. 3) and determine that content output is occurring on the user equipment 102.

At step 508, the content recommendation application determines (e.g., using control circuitry 410) viewing metrics for the first content. For example, the content recommendation application may access information about a user's viewing of content 104A to determine a length of time the user has been watching content 104A. In some embodiments, the viewing metrics may comprise actions taken to begin watching the content (e.g., a set of menu options accessed by a user within a media guidance application such as display 200). Still further, the viewing metrics may include the number of times the user has returned to watching content 104A from other content.

At step 510, the content recommendation application determines (e.g., using control circuitry 410) whether the viewing metrics indicate that output of the content recommendation should be blocked. For example, the content recommendation application may compare how long a user has been watching content with a time threshold that indicates engagement as described with reference to process 510A in FIG. 6. In some embodiments, the system may correlate the user's viewing of content 104A with the user's content preferences to refine the determination of whether to block the content recommendation such as described with reference to process 510B in FIG. 7.

In some embodiments, the viewing metrics may include indications of the user's actions while consuming content 104A. For example, systems and methods for determining a user's engagement level with content, including the use of gaze detection, are discussed in greater detail in connection with Wheatley et al., U.S. Patent Pub. No. 2015/0189377, published Jul. 2, 2015, which is hereby incorporated by reference herein in its entirety. The content recommendation application may determine the percentage of time the user is gazing at the content 104A as an indicator of whether the user is engaged with the content. If the user is not engaged with the content, as indicated because the user's gaze is not directed to the content for a threshold of the percentage of the content presentation, then the content recommendation application may determine that the content recommendation should not be blocked. In some embodiments, the content recommendation application may access the user's usage of other devices as part of the viewing metrics. For example, the user may be watching content on user equipment (e.g., user equipment 410) while also using a mobile phone (e.g., user equipment 408) that is in communication with the content recommendation application via a communication network (e.g., communication network 406). The content recommendation application may receive information that a user is presently surfing the web while other user equipment presents content 104A. This viewing metric may indicate the user is not engaged with content 104A and therefore the content recommendation application should not block the content recommendation.

Process 500 continues to step 512 if the content recommendation application determines the content recommendation should be blocked. If the content recommendation application does not determine the content recommendation should be blocked, process 500 continues at step 518. At step 512, the content recommendation application (e.g., using control circuitry 410) blocks the output of the content recommendation. For example, the content recommendation application may store the content recommendation into a recommendation buffer in memory and determine not to send a message containing the recommendation to user equipment 102. In some embodiments, the content recommendation application may hold the content recommendation in storage of the user equipment 102 without presenting the content recommendation on a display 312 of user equipment 102. Thus, the content recommendation application may, in some embodiments, prevent the generation of a content recommendation message (e.g., message 110) at a content consumption device (e.g., user equipment 102).

At step 514, the content recommendation application detects (e.g., using control circuitry 410) an input that changes the output of the first content (e.g., content 104A) to a second content (e.g., content 104B). In other words, the content recommendation application detects that a user is commanding user equipment (e.g., user equipment 102) to display a new show. In some embodiments, the content recommendation application receives a message via communication network 406 from user equipment (e.g., user equipment 102) that indicates the user changed a channel or selected new content in a media guidance application (e.g., display 200).

At step 516, the content recommendation application unblocks (e.g., using control circuitry 410) the content recommendation. For example, the content recommendation application may consider the input of step 514 to indicate the user is no longer engaged with the content being displayed and use that change of engagement as an optimal time to deliver the content recommendation. The content recommendation application may retrieve the content recommendation from storage (e.g., from a content recommendation buffer in storage 414). At step 518, the content recommendation application outputs the content recommendation. For example, the content recommendation application transmits (e.g., using control circuitry 410) a message to user equipment (e.g., user equipment 102 via communication network 406) that identifies the recommended content for display to a user. In some embodiments, the content recommendation application may be executed on user equipment 102 and outputs the content recommendation as a message (e.g., content recommendation prompt 110 on user equipment 102).

Figure 6:
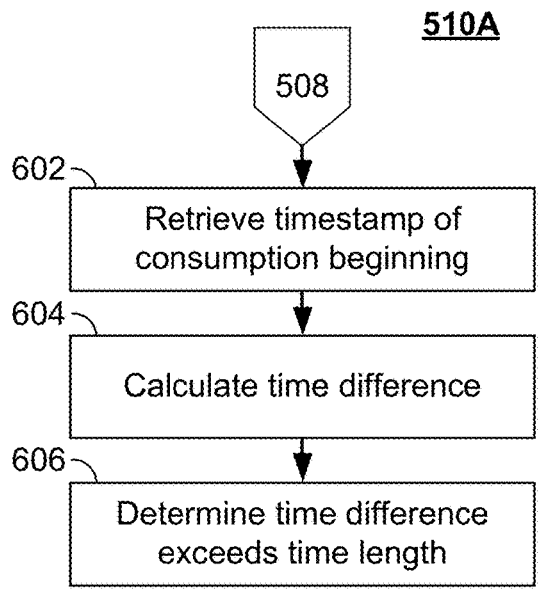
FIG. 6 is a flowchart of a detailed illustrative process for determining whether viewing metrics indicate output of a content recommendation should be blocked, in accordance with some embodiments of the disclosure.

FIG. 6 is a flowchart of a detailed illustrative process for determining whether viewing metrics indicate output of a content recommendation should be blocked, in accordance with some embodiments of the disclosure.

Process 510A begins after step 508 of FIG. 5. At step 602, the content recommendation application retrieves (e.g., using control circuitry 410) a timestamp that indicates when a device (e.g., user equipment 102) began outputting the first content (e.g., content 104B). For example, the user equipment 102 may transmit (e.g., via communication network 406) a message to a server 404 that is executing the content recommendation application when the user equipment 102 begins to output content to a user. The process server 404, may store a timestamp (e.g., a time noted in the message for when content output began or the time when the message was received at the server) and the content recommendation application may retrieve that timestamp from memory. Or the content recommendation application may be executed by user equipment 102 and the content recommendation application may store status information associated with content playback.

At step 604, the content recommendation application calculates a time difference between the current time (e.g., the time at which the content recommendation application is determining whether to output a content recommendation) and the timestamp. At step 606, the content recommendation application compares the time difference with a time threshold (e.g., time length) to determine whether to block the content recommendation. For example, the content recommendation application may retrieve a time threshold from memory and compare a length of time the user has watched the content 104A to determine whether the user is engaged with the content. If the length of time the user has been watching the content 104A exceeds this time threshold, then the content recommendation application may consider the user to be engaged with the content and determine that outputting the content recommendation would distract the user. Thus, the content recommendation application may determine the recommendation should be blocked to prevent distracting the user from being engaged with the content. In some embodiments, the time threshold is set to a percentage of the overall length of the content (e.g., 5%, 10%, or some configurable percentage). In some embodiments, the content recommendation application adjusts the time length over time in response to user action. For example, if the content recommendation application retrieves a two minute time threshold for a user that is watching content for 1:30, and the user rejects the recommendations, then the system may reduce the time threshold (e.g., by 5 seconds) in an attempt to train the time threshold to match the user's preference. Still further, a content recommendation application may analyze user access patterns across multiple users and across different content types to determine various indicators for engagement and train the time threshold to correlate with those access patterns.

Figure 7:
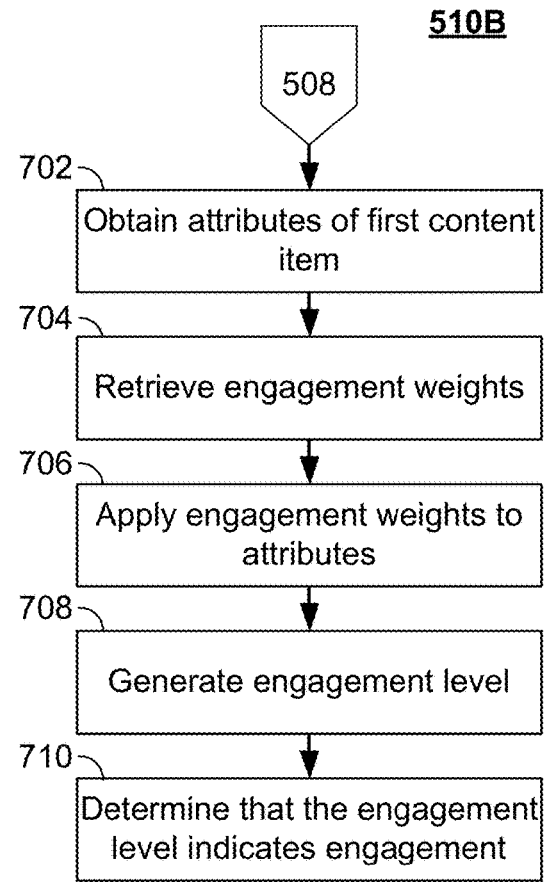
FIG. 7 is a flowchart of a detailed second illustrative process for determining whether viewing metrics indicate output of a content recommendation should be blocked, in accordance with some embodiments of the disclosure.

FIG. 7 is a flowchart of a detailed second illustrative process for determining whether viewing metrics indicate that output of a content recommendation should be blocked, in accordance with some embodiments of the disclosure.

Process 510B begins after step 508 of FIG. 5. At step 702, the content recommendation application obtains (e.g., using control circuitry 410) attributes associated with the first content item. For example, the content recommendation application may access storage (e.g., storage 414) to obtain metadata about the content (e.g., genre, actors, teams, sports, players, date content first appeared, content rating, content length, number of times the content has been watched be the user).

At step 704, the content recommendation application retrieves (e.g., using control circuitry 410) engagement weights corresponding with the attributes. For example, the content recommendation application may provide a system of adjustment values or multipliers associated with different attributes. In some embodiments, the content recommendation application provides a user interface that allows a user to adjust the attributes a user deems more important than others and saves those weights (e.g., numerical values) in storage for use when determining engagement levels. In some embodiments, the content recommendation application monitors interactions between the user and content to train the weights to make a more accurate generation of engagement level. For example, the content recommendation application may store indications of whether a user is accepting or rejecting each content recommendation along with information about the content on the screen at the time when the user accepts or rejects the recommendation. The system may then correlate common attributes (e.g., whenever baseball is on the screen the user rejects recommendations) and adjust the corresponding weights for those attributes to more accurately predict the user's engagement level.

At step 706, the content recommendation application applies (e.g., using control circuitry 410) the engagement weights to the corresponding attributes. For example, the content recommendation application may determine that a first decimal value (e.g., 83.0) should be applied to the content item because it is an animation movie; a second value (e.g., 20.0) should be applied because the content contains one actor the user enjoys; and a third value (e.g., 90.0) should be applied because the content is new, and the user typically watches new content all the way through. At step 708, the content recommendation application generates (e.g., using control circuitry 410), using the weighted attributes, an engagement level for the first content. For example, the content recommendation application may add all the weight values together to come up with a raw score representing the engagement level or may average the weighted values to come up with the engagement level.

At step 710, the content recommendation application determines (e.g., using control circuitry 410) whether the engagement level indicates viewing engagement. For example, the content recommendation application may retrieve an engagement threshold from storage 414 to correspond with a value the content recommendation application uses to assume a user is engaged with content. The content recommendation application may retrieve a hard-coded engagement threshold, or the engagement threshold may be configurable by either a service provider or by the user. In some embodiments, the content recommendation application may adjust the engagement threshold over time—as similarly described above with the attribute weights—to more accurately depict the engagement based on user interaction. For example, if a user rejects a content recommendation, the content recommendation application may evaluate whether the threshold was set too high such that content recommendations that were being made interrupted a user's enjoyment of content and, based on the user's reactions to the content recommendation (i.e., consistent rejections), an adjustment of the threshold would be appropriate.

Figure 8:
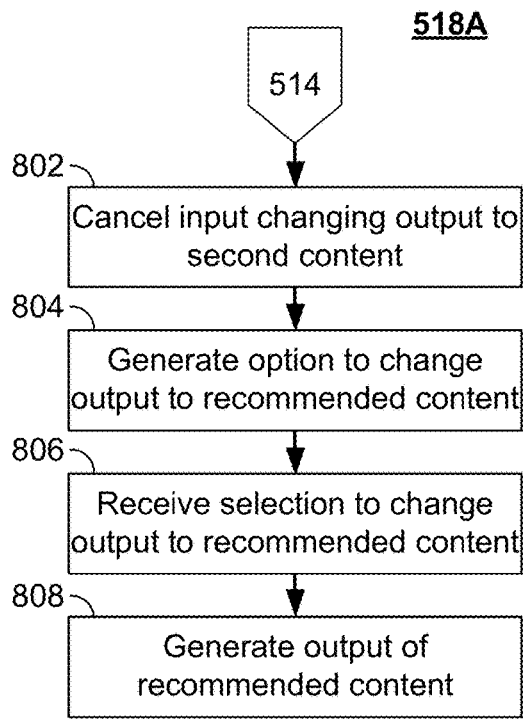
FIG. 8 is a flowchart of a detailed illustrative process for outputting a content recommendation, in accordance with some embodiments of the disclosure.

FIG. 8 is a flowchart of a detailed illustrative process for outputting a content recommendation, in accordance with some embodiments of the disclosure.

Process 518A begins after step 516 of FIG. 5. At step 802, the content recommendation application cancels (e.g., using control circuitry 304 or control circuitry 410) the input to change output of the first content to output of the second content. For example, in an embodiment where some portion of the content recommendation application resides on a user equipment (e.g., user equipment 102) then the content recommendation application may detect an input on user input interface (e.g., 310) that is a command to change to new content (i.e., a channel change command or command to play back content). The content recommendation application may, having detected such a command, intercept and stop the command from completing execution. In some embodiments, the content recommendation application resides on a remote server (e.g., 404), and the content recommendation application may receive a message indicating the user is changing the content. The content recommendation application, in those embodiments, may send a responsive message to user equipment (e.g., user equipment 102) to cancel the input.

At step 804, the content recommendation application generates (e.g., using control circuitry 410), for output by a content consumption device, an option to change output of the first content to output recommended content, wherein the recommended content is identified by the content recommendation. For example, the content recommendation application generates a content recommendation prompt (e.g., 110) on a display (e.g., 312). In some embodiments, generating the content recommendation prompt may comprise building a message that is transmitted to a user equipment (e.g., 102) for display to the user.

At step 806, the content recommendation application (e.g., using control circuitry 410) receives a selection of the option to change output of the first content to output of the recommended content. For example, the content recommendation application may receive a selection of an option to accept the recommended content (e.g., option 116) or an option to reject the recommended content (e.g., option 118).

At step 808, the content recommendation application (e.g., using control circuitry 410) generates, for output by the content consumption device, the recommended content. For example, a remote server 404 may direct a stream of the recommend content to a user equipment (e.g., 102). In some embodiments, the content recommendation application resides on a user equipment (e.g., 102) and the content recommendation application begins outputting the recommended content on a display (e.g., 312).

Figure 9:
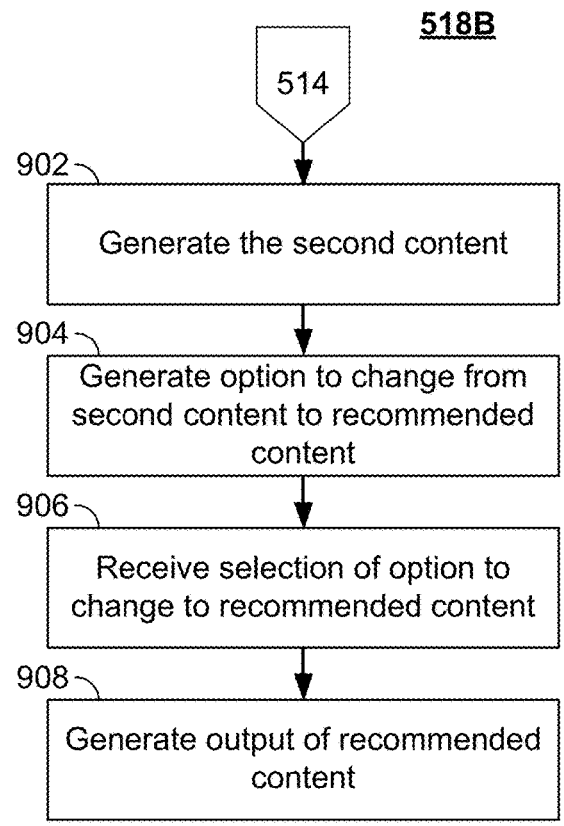
FIG. 9 is a flowchart of a detailed second illustrative process for outputting a content recommendation, in accordance with some embodiments of the disclosure.

FIG. 9 is a flowchart of a detailed second illustrative process for outputting a content recommendation, in accordance with some embodiments of the disclosure.

Process 518B begins after step 516 of FIG. 5. At step 902, the content recommendation application generates (e.g., using control circuitry 410), for output by a content consumption device, the second content. For example, a user equipment 102 begins outputting the second content on a display (e.g., 312). At step 904, the content recommendation application generates (e.g., using control circuitry 410), for output by the content consumption device (e.g., user equipment 102), an option to change output of the second content to output of recommended content, wherein the recommended content is identified by the content recommendation. For example, in an embodiment where some portion of the content recommendation application resides on a user equipment (e.g., user equipment 102) then the content recommendation application may detect an input on user input interface (e.g., 310) that is a command to change to new content (i.e., a channel change command or command to play back content). The content recommendation application may, having detected such a command, intercept and stop the command from completing execution. In some embodiments, the content recommendation application resides a remote server (e.g., 404) and the content recommendation application may receive a message indicating the user is changing the content. The content recommendation application, in those embodiments, may send a responsive message to user equipment (e.g., user equipment 102) to cancel the input.

At step 906, the content recommendation application receives (e.g., using control circuitry 410) a selection of the option to change output of the second content to output of the recommended content. For example, the content recommendation application may receive a selection of an option to accept the recommended content (e.g., option 116) or an option to reject the recommended content (e.g., option 118).

At step 908, the content recommendation application (e.g., using control circuitry 410) generates, for output by the content consumption device, the recommended content. For example, a remote server 404 may direct a stream of the recommend content to a user equipment (e.g., 102). In some embodiments, the content recommendation application resides on a user equipment (e.g., 102), and the content recommendation application begins outputting the recommended content on a display (e.g., 312).

Figure 10:
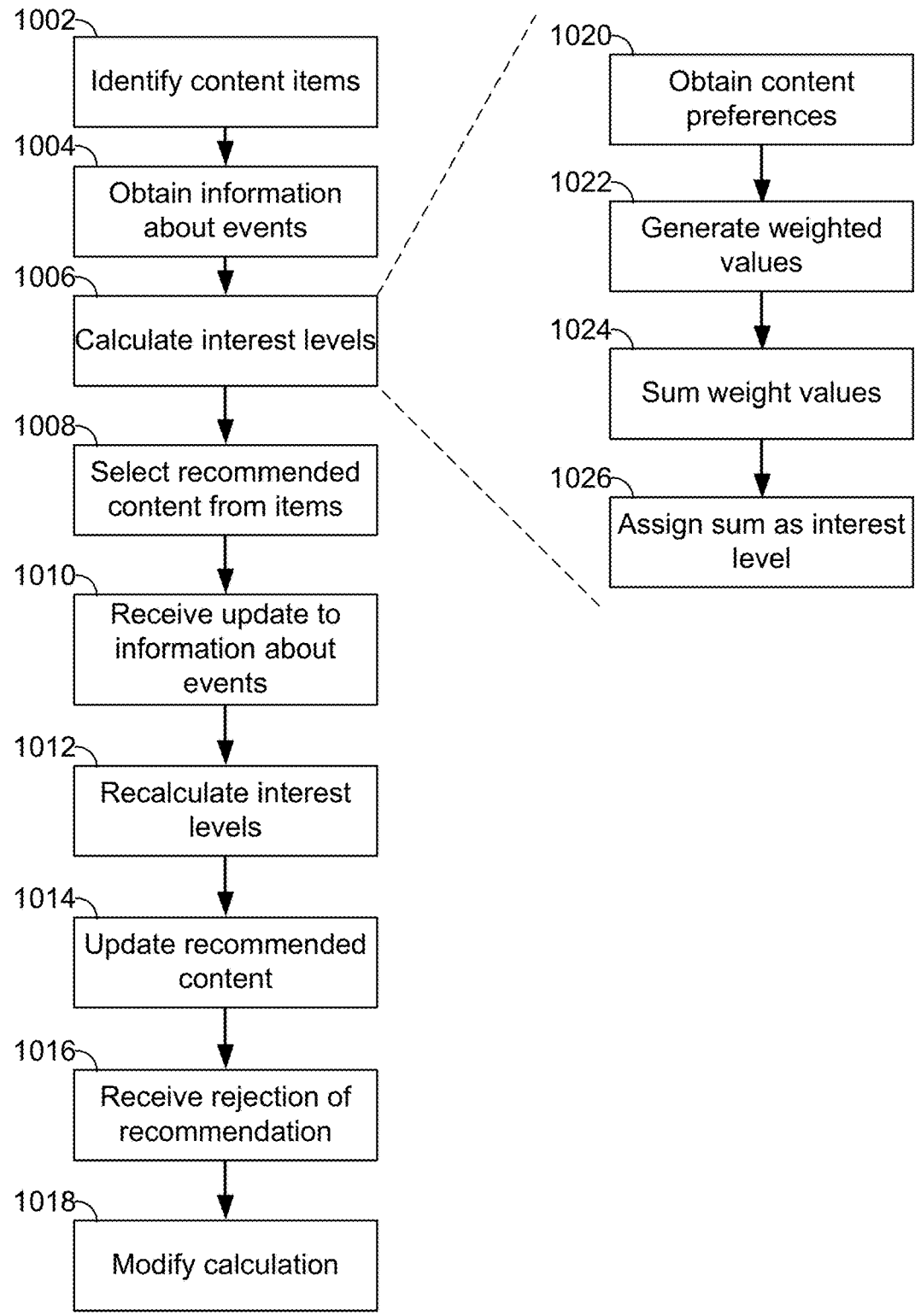
FIG. 10 is a flowchart of a detailed illustrative process for determining a content recommendation, in accordance with some embodiments of the disclosure.

FIG. 10 is a flowchart of a detailed illustrative process for determining a content recommendation, in accordance with some embodiments of the disclosure. At step 1002, the content recommendation application identifies (e.g., using control circuitry 410) a plurality of content items. For example, the content recommendation application may access storage (e.g., 414) and obtain a listing of potential content items (e.g., a listing of live content items). At step 1004, the content recommendation application obtains (e.g., using control circuitry 410) information about the content items. For example, the content recommendation application may obtain metadata about the content or analyze the content to retrieve details about the content (e.g., information about what happens in the content or the current status of the content). In the case where content items correspond with real-life events, the content recommendation application may obtain status and data about the real-life event (e.g., a sports game).

The content recommendation application may retrieve information specific to the content item or information that applies to the content item but is also general enough to apply to other content items as well. For example, the content recommendation application may obtain the time in a season that a sporting event is occurring (e.g., preseason, week one, week four, playoffs, championship), the relative ranking of competitors in the competition (e.g., rank one versus rank two), a current score between teams participating in a live sporting event, a scoring frequency indicator for a live sporting event (e.g., an indicator of how often the score is changing), an amount of time remaining in a live sporting event, or a number of viewers associated with the content item. Still other information pertaining to a content item may be used to determine a predicted interest level for a content item.

At step 1006, the content recommendation application calculates (e.g., using control circuitry 410), based on the information about the content, interest levels for the plurality of content items. Users may have different interests and the content recommendation application may dynamically calculate projected user interest for all content (e.g., live sports programming). The content recommendation application may allow a user to set their threshold for notification (e.g., 1 through 1000). If the user set a threshold of 300, then the content recommendation application will not notify the user unless the predicted interest for a piece of content exceeds that threshold (e.g., 300). The content recommendation application would likely calculate a different predicted interest level for each individual user. In some embodiments, the content recommendation application calculates interest levels for the plurality of content items in accordance with steps 1020-1026 of FIG. 10. At step 1020, the content recommendation application obtains (e.g., using control circuitry 410) content preferences. For example, the content recommendation application may obtain preferences related to a user for the type of content and status of the content. At step 1022, the content recommendation application generates (e.g., using control circuitry 410) weighting values, based on the content preferences, for one or more attributes in the information about the content. For example, the content recommendation application may determine that the user has a preference for close games in the late stages. Thus, an attribute of a baseball game indicating it is in the ninth inning may be weighted heavily (e.g., with a score of 90) and an attribute indicating the score of the same game is within 2 runs may also be weighted heavily (e.g., with a score of 80). At step 1024, the content recommendation application sums (e.g., using control circuitry 410) the weighting values for a plurality of attributes associated with the content items. At step 1026, the content recommendation application assigns (e.g., using control circuitry 410) the sums of the weighting values for each of the content items to the corresponding content item.

At step 1008, the content recommendation application selects (e.g., using control circuitry 410), based on the interest levels for the plurality of content items, recommended content from the plurality of content items. For example, the content recommendation application accesses a list of calculated interest levels for content and determines which interest level is calculated higher than the others. In some embodiments, the content recommendation application also determines whether the calculated interest levels exceed a threshold level retrieved from storage (e.g., 414).

At step 1010, the content recommendation application receives (e.g., using control circuitry 410) an update to the information about the content. For example, the status of a sports game, or other real-life event, may change as time progress (e.g., a score change, the amount of time remaining, the number of people watching the game). The content recommendation application may access an information source, e.g., a data source such as media content source 402, to retrieve those updates. At step 1012, the content recommendation application recalculates (e.g., using control circuitry 410), based on the updated information about the content, updated interest levels for the plurality of content items. At step 1014, the content recommendation application updates (e.g., using control circuitry 410), based on the updated interest levels for the plurality of content items, the recommended content. For example, the content recommendation application may change a content recommendation from a first recommended content item (e.g., a baseball game such as content 104C) to a second recommended content item (e.g., a hockey game) based on a second interest level for the second recommend content item rising above a first interest level for the first recommended content item.

In some embodiments, the content recommendation application may modify the calculation used to generate the interest levels based on whether a user accepts or rejects the content recommendation. For example, at step 1016, the content recommendation application receives (e.g., using control circuitry 410), from a content consumption device, an indication that the content recommendation was rejected. At step 1018, the content recommendation application modifies (e.g., using control circuitry 410), based on receiving the indication that the content recommendation was rejected, the calculation of interest levels for the plurality of content items, wherein the modification of the calculation is performed to lower a calculated interest level for recommended content corresponding with the content recommendation. For example, the content recommendation application would provide the content recommendations to each user, based on information relevant to that user. When the user accepts a content recommendation (i.e., switches to the recommended content) the content recommendation application may reinforce the calculation of the predicted interest level by, e.g., increasing the weighting of the factors. If the user rejects the content recommendation, the content recommendation application may reduce the calculated interest level by, e.g., decreasing the weighting of factors.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in realtime. It should also be noted, the systems and/or methods described above may be applied to, or used in accordance with, other systems and/or methods.

What is claimed is:

1. A method comprising:
   detecting an output of a content item;
   determining, based at least in part on the output of the content item, an engagement score for a user consuming the output of the content item;
   based at least in part on the determined engagement score exceeding a predetermined threshold, blocking a content recommendation from being presented;
   detecting a change to the engagement score; and
   based at least in part on determining that the engagement score is no longer exceeding the predetermined threshold:
   unblocking the content recommendation; and
   generating for display the content recommendation, wherein the generating for display the content recommendation comprises causing to be presented, in an interface, an option to change the output of the content item to recommended content, and wherein the recommended content is identified by the content recommendation; and
   receiving a selection of the option; and
   in response to receiving the selection, changing the output of the content item to the recommended content.

2. The method of claim 1, wherein the content item is a first content item, the method further comprising receiving a user input to change the output of the first content item to the output of a non-content item.

3. The method of claim 2, wherein the non-content item comprises a guide element, a search element, an options element, or a video on-demand (VOD) element.

4. The method of claim 1, wherein the content item is a first content item, the method further comprising receiving a user input to change the output of the first content item to the output of a second content item.

5. The method of claim 1, wherein the blocking the content recommendation comprises storing, in memory, the content recommendation, and wherein the unblocking the content recommendation comprises retrieving, from the memory, the content recommendation.

6. The method of claim 1, further comprising determining whether the content recommendation should be presented by:
   determining viewing metrics for the output of the content item; and
   determining whether the content recommendation should be presented in the interface based on the viewing metrics.

7. The method of claim 1, wherein the determining the engagement score for the user consuming the output of the content item comprises:
   obtaining attributes associated with the content item;
   retrieving engagement weights corresponding with the attributes;
   generating weighted attributes by applying the engagement weights to the corresponding attributes; and
   generating, using the weighted attributes, an engagement level for the content item.

8. The method of claim 7, wherein the blocking the content recommendation from being presented comprises determining the engagement level indicates viewing engagement with the content item.

9. The method of claim 1, further comprising:
   identifying a plurality of content items;
   obtaining information about real-life events related to the plurality of content items;
   obtaining content preferences; and
   generating the content recommendation by selecting the recommended content from the plurality of content items based on the information about the real-life events and the content preferences.

10. A system comprising:
    a memory; and
    control circuitry configured to:
    detect an output of a content item;
    determine, based at least in part on the output of the content item, an engagement score for a user consuming the output of the content item;
    based at least in part on the determined engagement score exceeding a predetermined threshold, block a content recommendation from being presented;
    detect a change to the engagement score; and
    based at least in part on determining that the engagement score is no longer exceeding the predetermined threshold:
    unblock the content recommendation; and
    generate for display the content recommendation, wherein the control circuitry is configured to generate for display the content recommendation by causing to be presented, in an interface, an option to change the output of the content item to recommended content, and wherein the recommended content is identified by the content recommendation;
receive a selection of the option; and
in response to receiving the selection, change the output of the content item to the recommended content.

11. The system of claim 10, wherein the content item is a first content item, and wherein the control circuitry is further configured to receive a user input to change the output of the first content item to the output of a non-content item.

12. The system of claim 11, wherein the non-content item comprises a guide element, a search element, an options element, or a video on-demand (VOD) element.

13. The system of claim 10, wherein the content item is a first content item, and wherein the control circuitry is further configured to receive a user input to change the output of the first content item to the output of a second content item.

14. The system of claim 10, wherein the control circuitry, when blocking the content recommendation, is configured to store, in the memory, the content recommendation, and wherein the control circuitry, when unblocking the content recommendation, is configured to retrieve, from the memory, the content recommendation.

15. The system of claim 10, wherein the control circuitry is further configured to determine whether the content recommendation should be presented by:
determining viewing metrics for the output of the content item; and
determining whether the content recommendation should be presented in the interface based on the viewing metrics.

16. The system of claim 10, wherein the control circuitry is configured to determine the engagement score for the user consuming the output of the content item by:
obtaining attributes associated with the content item;
retrieving engagement weights corresponding with the attributes;
generating weighted attributes by applying the engagement weights to the corresponding attributes; and
generating, using the weighted attributes, an engagement level for the content item.

17. The system of claim 16, wherein the control circuitry is configured to block the content recommendation from being presented by determining the engagement level indicates viewing engagement with the content item.

18. The system of claim 10, wherein the control circuitry is further configured to:
identify a plurality of content items;
obtain information about real-life events related to the plurality of content items;
obtain content preferences; and
generate the content recommendation by selecting the recommended content from the plurality of content items based on the information about the real-life events and the content preferences.

* * * * *